United States Patent Office 3,044,637
Patented July 17, 1962

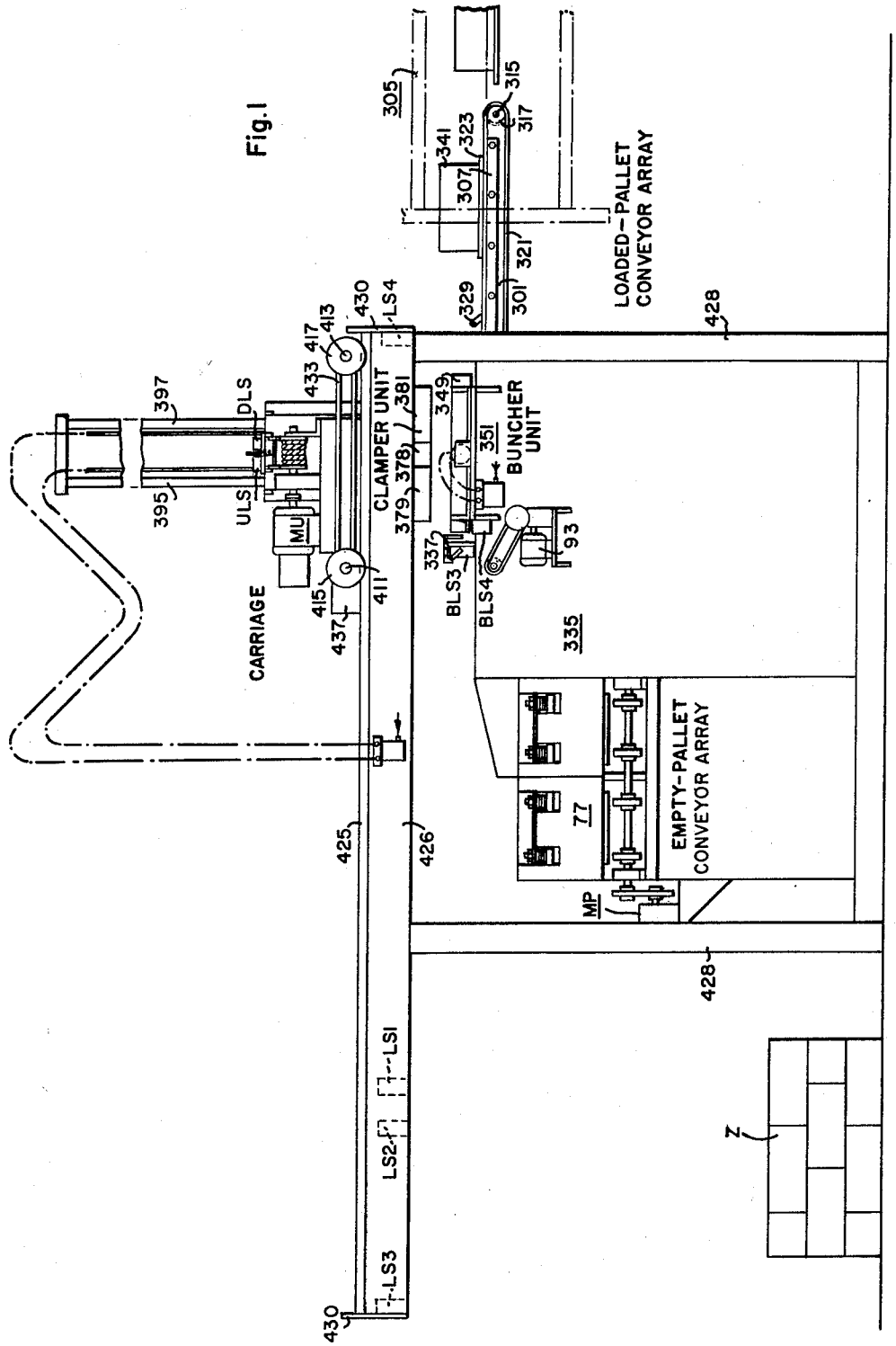

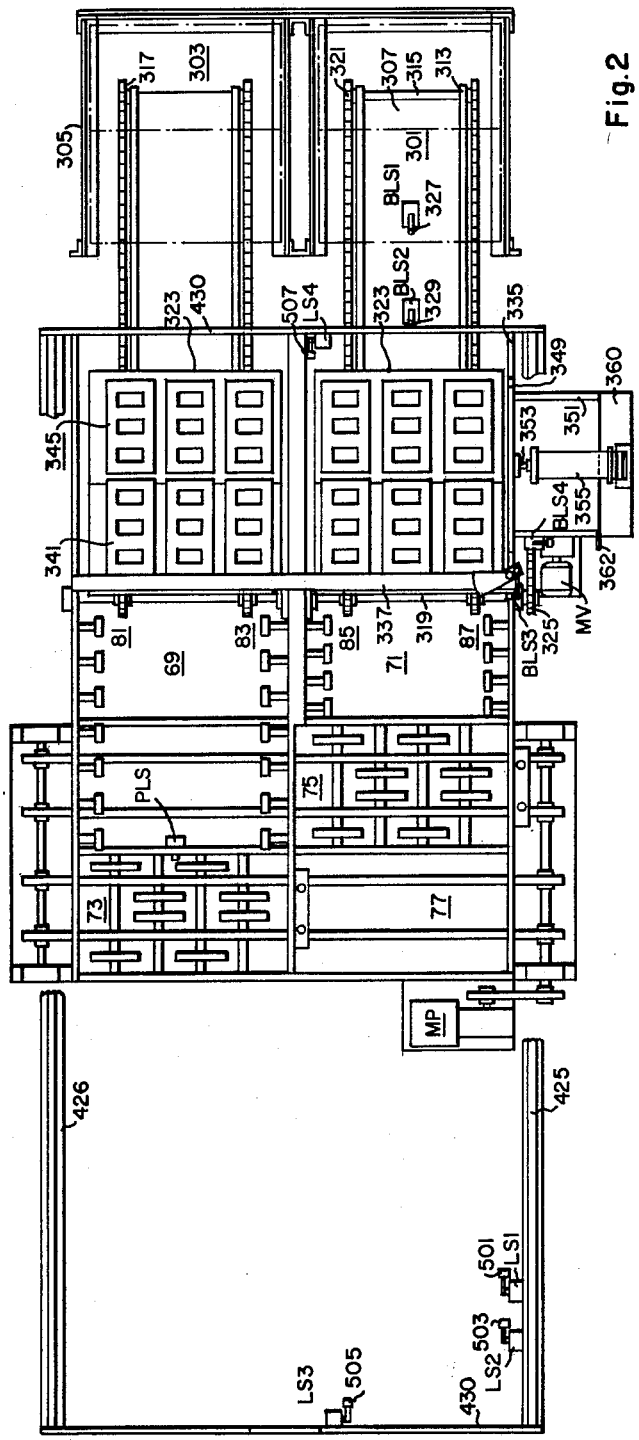

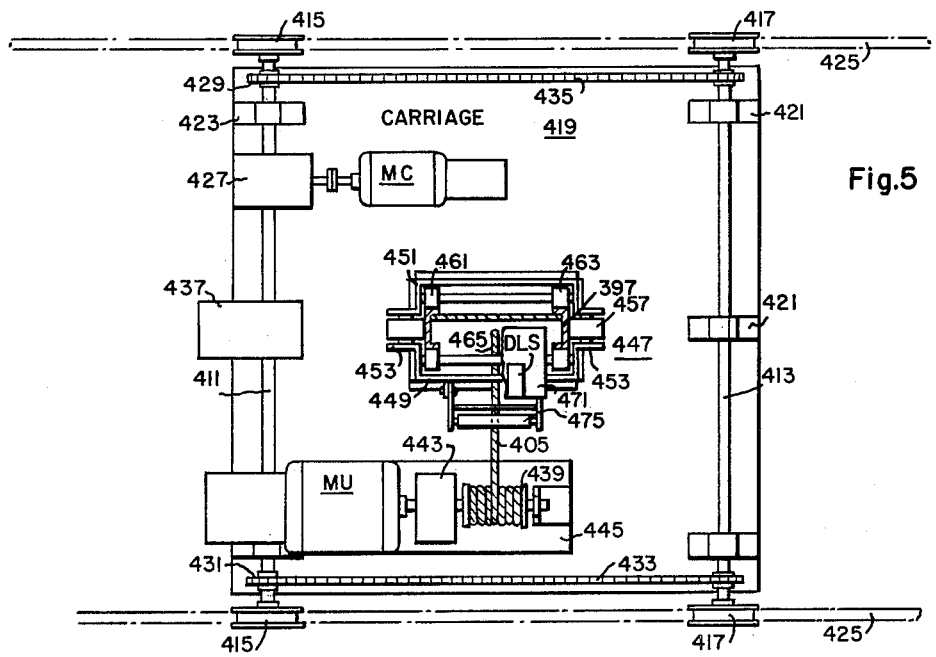
Fig.5
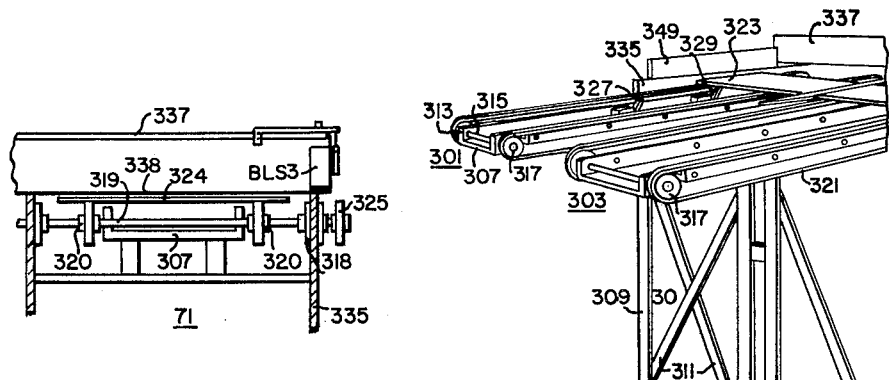
Fig.4
Fig.3

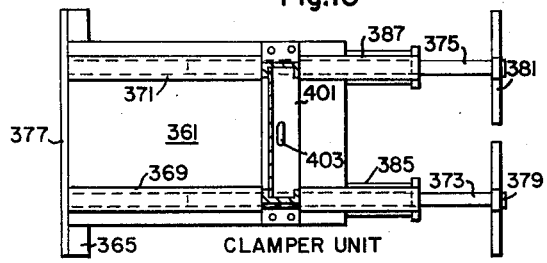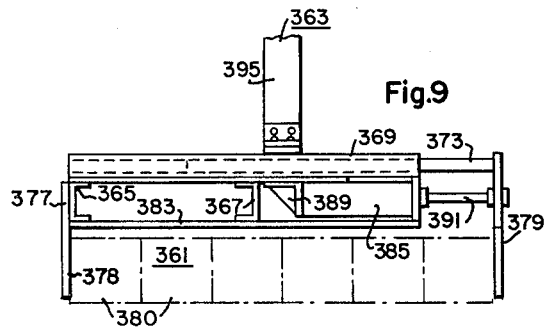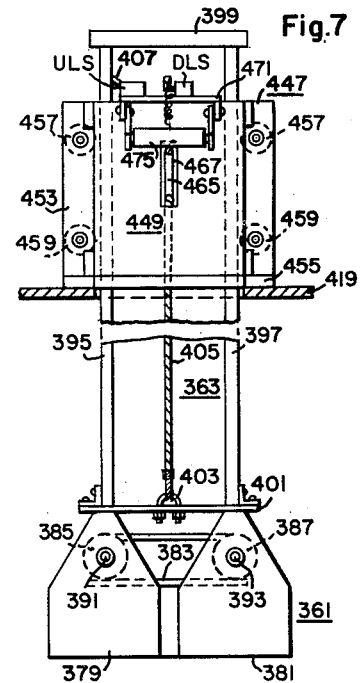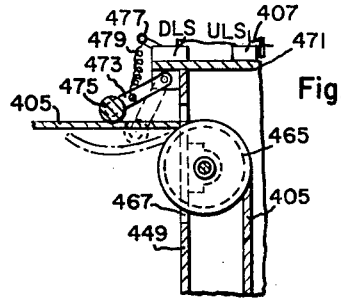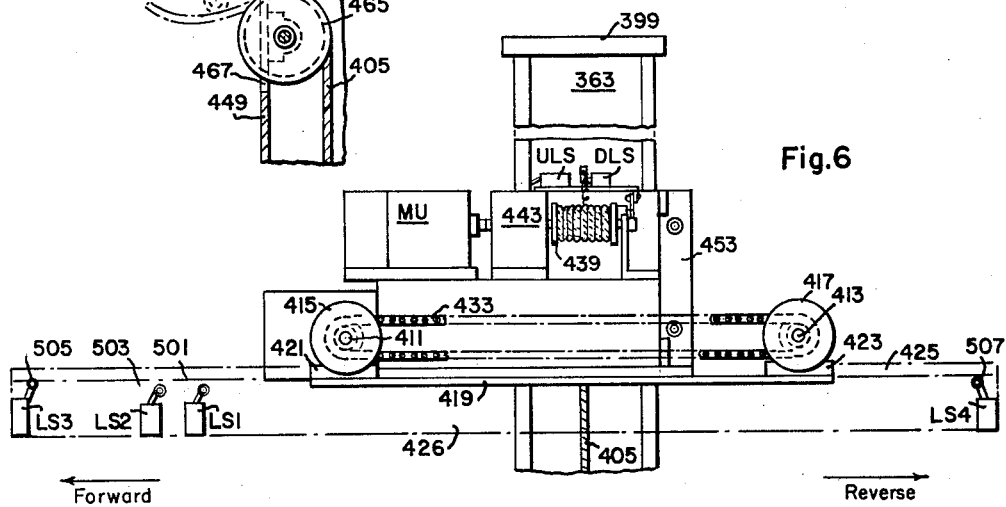

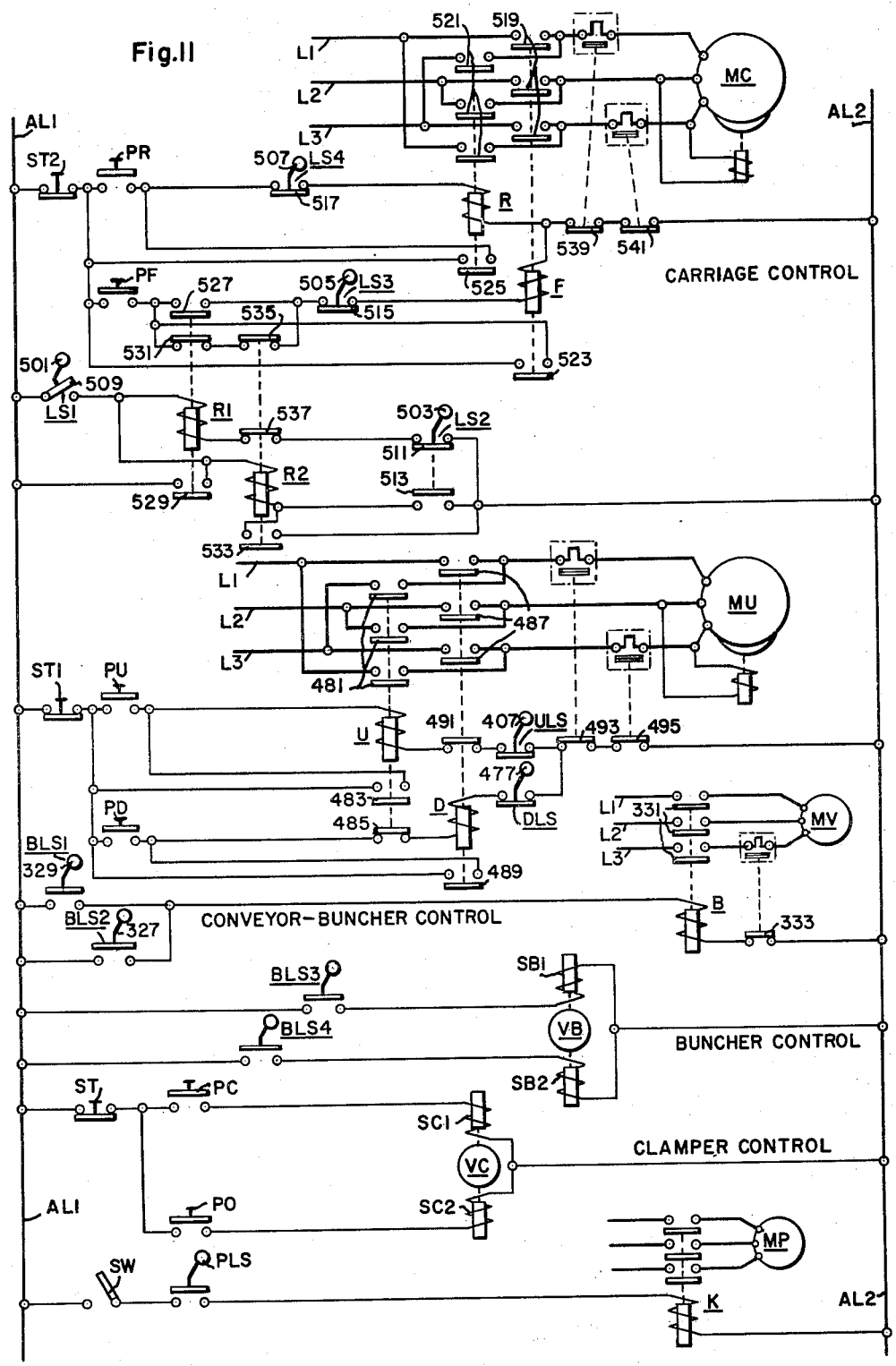

3,044,637
BLOCK HANDLING APPARATUS
George S. Repasky and Joseph F. Repasky, Greensburg, Pa., assignors to Greensburg Concrete Block Co., Greensburg, Pa., a corporation of Pennsylvania
Filed July 23, 1957, Ser. No. 673,753
17 Claims. (Cl. 214—6)

This invention relates to the building-block art, and has particular relationship to apparatus for handling the blocks and the pallets on which they are made. Patent 2,990,069, to Joseph Repasky and George Repasky, granted June 27, 1961, for Pallet Handling and Conveying Apparatus, is incorporated in this application by reference.

The building blocks with which this invention particularly concerns itself are molded from concrete on pallets by a machine such as that shown in Corwin Patent 2,586,210, for example. The block-loaded pallets are transferred from the molding machine to a rack such as is shown on the title page of Besser Manufacturing Company Leaflet, Bulletin 98, and the loaded rack is moved into a drying oven where the blocks are cured. The rack is then removed from the oven to a stacking area where the dry blocks are removed from the pallets, and the pallets are returned to the feed magazine of the machine for further use in molding additional blocks.

Apparatus, in accordance with the teachings of the prior art, for stacking blocks is illustrated on the title page of the Besser Bulletin 98. As shown on this page, the rack is a framework structure having a plurality of pairs of ledges at different horizontal levels on which pallets, either loaded or empty, may be supported. In the rack shown there are two pairs of ledges at each level and on each pair two pallets are supported. Each pallet on the rack shown in the Besser leaflet holds three blocks and in the rack shown in the leaflet, there are then twelve blocks on each level. Viewed generally, the rack has a plurality of levels on each of which a plurality of rows (two in the leaflet but any reasonable number generally) of pallets are supported, there being a plurality (two in the leaflet but any reasonable number generally) of pallets in each row.

The leaflet shows a block cuber for removing the blocks to a stack. This cuber is a clamping mechanism having pivotal jaws capable of engaging only the blocks on one pallet at a time. Usually this is three eight-inch wide blocks or the equivalent in width of blocks of lesser width. The cuber is operated by an attendant who uses it to remove the blocks on one pallet at a time from the pallets on a rack to a pile. After the blocks are removed, the rack and its pallets are returned to a position where the pallets may be removed and fed into the magazine of the block molding machine.

Prior art block-handling apparatus has the disadvantage that its demand for manual labor is excessively high. For example, manual labor is required to handle a cuber such as Besser's. Since the blocks are heavy each laborer stacks the blocks at a relatively low rate and a number of laborers is usually required to keep up with a machine delivering the blocks at the rate now current in the block-making industry which may be as high as 4000 per day even in a small plant. In addition, laborers are required for returning the pallets to the block making machine.

It is, accordingly, a principal object of this invention to reduce the manual labor demand in block handling.

Another object of this invention is to provide block-handling apparatus which shall be capable of stacking blocks at a high rate commensurate with the rate at which blocks are produced.

A further object of this invention is to provide block-handling apparatus which shall include facilities for stacking the blocks from block-loaded pallets and returning the empty pallets to the machine with a minimum of manual labor.

This invention in one of its aspects arises from the realization that the speed of the stacking operation can be increased by removing all of the blocks on a level of a rack as a unit to the stacking position. As applied to the Besser rack, the realization of this concept would lead to the stacking of twelve eight-inch block equivalents rather than three eight-inch block equivalents in a single operation and would thus multiply the speed of stacking by four. But the groups of blocks on the rack are widely separated and must be bunched to be handled as a unit and it is a specific object of this invention to provide apparatus for bunching the blocks on a single level of a rack into an assembly which permits the handling of all of the blocks on the level as a single unit.

Another specific object of this invention is to provide a conveyor apparatus for transmitting a plurality of loaded pallets from each of the levels of a rack and for bunching the blocks on the pallets into an assembly so that they may be lifted and moved as a unit.

Another aspect of this invention arises from the realization that the empty-pallet conveyor disclosed in FIGS. 8, 9, 10 and 11 of Patent 2,990,069, could serve to transmit the pallets automatically to the molding machine. The realization of this aspect of the invention involves the cooperation of the loaded-pallet conveyor apparatus in accordance with this invention, and the empty-pallet conveyor, in accordance with Patent 2,990,069. The cooperation of these conveyors requires that the blocks on the loaded pallets be separated from the pallets and it is a further specific object of this invention to provide apparatus cooperative with block-loaded pallet conveyor apparatus and an empty-pallet conveyor for separating the blocks on the pallets from, and permitting the pallets to be transmitted on, the empty-pallet conveyor.

A further aspect of this invention involves the transfer of the blocks from the position where they are bunched to the stacking position, and it is a further specific object of this invention to provide apparatus for effecting such transfer.

It is another specific object of this invention to provide a novel clamping unit capable of engaging a generally horizontal assembly of blocks at one position, removing this assembly from this position to a stacking position and releasing the assembly properly at the stacking position.

An incidental object of this invention is to provide a carriage which shall cooperate with the clamping unit to move the block assembly from the bunching position to the stacking position and to stack the blocks properly.

A further incidental object of this invention is to provide a drive for such a stacking unit which shall permit the block assembly to be stacked with the respective blocks of these assemblies staggered so that the stacks will be firm.

The apparatus in accordance with this invention includes an array of loaded-pallet conveyors corresponding in number to the rows of loaded pallets on each level of the rack. These conveyors communicate with a corresponding array of empty-pallet conveyors as disclosed in FIGS. 8, 9, 10 and 11 of Patent 2,990,069. At the junction between the conveyor arrays the blocks are separated from the pallets and the pallets are returned to the block making machine as shown in FIG. 1 of Patent 2,990,069. For separating the blocks and the pallets, a block stopping mechanism is provided between the conveyor arrays. This block stop extends generally perpendicularly to the direction of movement of the loaded pallets so that when the loaded pallets are advanced to this block stop, the blocks on the pallets are stopped while the empty pallets are moved through a slot in the stop onto the empty pallet conveyors.

The apparatus, in accordance with this invention, also includes a buncher cooperative with the block stop. This buncher includes a pushing mechanism or pusher on one side of the loaded-pallet conveyor array. This pusher is actuable by the blocks when they approach the block stop, and pushes the blocks on the separate conveyors together into a bunched assembly of generally rectangular form. The assembly is generally horizontal and when formed is bounded on one side by the block stop, and on another side by the pusher. The pusher is adjustable in a direction along the block stop so that the extent of the movement of the blocks which it pushes may be controlled. The pusher usually pushes the blocks together into a loose assembly so that they may be engaged by a clamper. The clamper compresses the blocks into a tighter assembly. In situations in which a clamper, in accordance with this invention, having adequate jaw separation is available the pusher may be dispensed with.

In accordance with this invention, the loaded pallet conveyors are controlled by the loaded pallets themselves. These conveyors include pallet actuable switch means which is closed when it is engaged by the loaded pallets and closes the conveyor-drive circuit to advance the conveyors. (The switch means can also be closed by empty pallets.) The conveyors are moved only so long as the switch means is actuated by pallets but the switch means is such that the conveyors are maintained in motion until the blocks on the pallets engage the block stop and the blocks on the pallets in each row are moved together. The pallet drive is then deenergized but continues to operate by reason of its inertia so that the blocks engage the stop firmly. When the pusher of the bunching means starts to operate, the conveyors have stopped.

The apparatus, according to this invention, also includes a carriage which is movable on a track extending over the conveyors between a position over the bunching area and a position over the stacking area. The carriage carries and guides a clamping unit. This unit consists of a boom and a clamper. The clamper unlike prior art clampers is particularly adapted to engage and hold the generally rectangular horizontal assembly of blocks. This clamper includes jaw means extending from a support adapted to span the assembly with the jaws parallel to two of the parallel sides of the assembly. Such a clamper may be lowered vertically to a position in which it spans the assembly. The jaws may then be engaged with the assembly and the clamper raised.

The boom is guided by rollers in the carriage and carries the clamper at its lower end. The clamping unit is movable upwardly and downwardly by a winch, on the carriage. The cable of the winch preferably engages the clamper. This cable cooperates with a switch mechanism which maintains the drum of the winch in rotation so long as the cable is tensioned as the unit is being lowered and stops the rotation when the clamper reaches the position over the block assembly and the cable relaxes.

In the use of the apparatus, the carriage is moved over the bunching region and the clamper is lowered and engaged with the blocks. Then the clamping unit is raised and the carriage is moved to the stacking area. The clamping unit is then lowered and the clamper released to release the blocks in the assembly in which they have been stacked.

The carriage is controlled by switch mechanisms so that it may be stopped in a first position or a second position when it reaches the stacking area. The positions are separated by a distance which may be generally a fraction, for example, one half or one third, of the width of the individual blocks in the assembly in the direction along the tracks. The switch mechanisms are so interlocked that the carriage stops in each of the positions during alternate stacking operations. Thus the blocks are stacked in staggered relationship.

The novel features considered characteristic of this invention are disclosed generally above. The invention, itself, both as to its organization and its method of operation, together with additional objects and advantages thereof, will be understood from the following description of a specific embodiment when read in connection with the accompanying drawings, in which:

FIGURE 1 is a view in side elevation of apparatus in accordance with this invention;

FIG. 2 is a view in plan of the apparatus in accordance with this invention, with the track, carriage and clamping unit removed;

FIG. 3 is a fragmental view in perspective showing the loaded-pallet conveyor array in accordance with this invention;

FIG. 4 is a fragmental view in end elevation as viewed from the direction towards which the conveyors are movable of a portion of the block stopping mechanism in accordance with this invention;

FIG. 5 is a plan view of the carriage in accordance with this invention;

FIG. 6 is a view in side elevation of the carriage shown in FIG. 5;

FIG. 7 is a view in side elevation of the clamper unit according to this invention;

FIG. 8 is a fragmental view, partly in section and partly in side elevation of the winch control mechanism in accordance with this invention;

FIG. 9 is a view in side elevation of a clamper in accordance with this invention;

FIG. 10 is a view in plane of the clamper shown in FIG. 9; and

FIG. 11 is the circuit diagram of the control for the apparatus in accordance with this invention.

*Description*

The apparatus shown in the drawings includes a loaded-pallet conveyor array, an empty-pallet conveyor array, a buncher, a carriage and a clamper unit. The loaded-pallet conveyor array and the empty-pallet conveyor array are mounted in communication with each other with the buncher between them. The buncher is capable of bunching the blocks on loaded pallets advanced by the loaded-pallet conveyor array and permitting the empty pallets to pass through to the empty-pallet conveyor array from which they are transmitted to the molding machine. The carriage is mounted movable on a track (425) and carries the clamper unit. The track extends from a position over the buncher to a position where the blocks are stacked. The clamper unit is movable vertically in the carriage. When the carriage is over the buncher, the clamper unit may be moved down to engage blocks, and when the carriage is in the stacking area, the clamper unit may be moved down to deposit blocks on a stack.

The apparatus includes a plurality of drives supplied from conductors L1, L2, L3 (FIG. 11) which are adapted to be connected to the polyphase buses of a commercial supply through the usual disconnects or circuit breakers (not shown). The drives are controlled from relays and switches which may be energized from supply conductors AL1 and AL2. Conductors AL1 and AL2 may derive their power from two of the conductors L1, L2, L3 or from the commercial buses through a transformer.

The loaded-pallet conveyor array (FIGS. 1, 2, 3) includes a plurality of conveyors 301 and 303 corresponding in number to the rows of pallets on a rack 305 (FIG. 1) and arranged in an array corresponding to these rows. The apparatus actually shown in the drawings is capable of operation with racks of the type disclosed in the Besser leaflet. Such racks have two rows of two pallets each on each level. To cooperate with such racks the loaded-pallet conveyor array includes the pair of conveyors 301 and 303 so spaced as to correspond to the spacing between the rows of pallets on the racks.

Each conveyor 301 and 303 includes an elongated channel shaped plate 307 (FIG. 3) mounted on a plurality of supports each including a pair of vertical strips 309 braced by cross strips 311. At one end each channel plate 307 is provided with bearings 313 in which a shaft 315 carrying sprocket wheels 317 at each end externally to the upwardly extending lips of the channels is rotatable (FIG. 3). Bearings 318 (FIG. 4) are also provided at the other ends of the channels 307 through which a common shaft 319 passes. This shaft 319 carries sprocket wheels 320 which are mounted on each side of the lips of the channel members 307 externally to these lips.

The sprocket wheels 315 and those not shown extending from each end of the channels 307 are engaged by a continuous chain 321. The chains 321 extend above the ends of the channels 307 and are thus capable of supporting loaded pallets 323 or unloaded pallets 324 (FIG. 3). The common shaft 319 and the sprocket wheels 320 on this shaft are driven through gearing 325 by a motor MV (FIG. 2). When the motor MV is rotated the chains 321 are moved and thus are capable of advancing any pallets 323 or 324 disposed on the chains. The channels 307 and the associated chains 321 of each conveyor extend beyond the end supports 309—311 (FIG. 3) a distance such that a rack 305 may be conveniently interlaced with the chains 321 so that when the chains are moved, the loaded pallets 323 on any level of the rack are carried from the rack along the conveyors.

A pair of limit switches BLS1 and BLS2 are mounted longitudinally spaced along the channel 307 of the conveyor 301. The actuating handles 327 and 329 of these switches extend above the chains 321 so that the switches may be actuated by pallets 323 on the conveyor 301.

The control circuit for the motor MV (FIG. 11) includes a contactor B. The motor MV is adapted to be connected to supply conductors L1, L2 and L3 through the normally open contacts 331 of this contactor. The energization of the motor MV is controlled by the limit switches BLS1 and BLS2 through either of which an overload contact 333 and the coil of contactor B may be connected between conductors AL1 and AL2. The switches BLS1 and BLS2 are normally open but may be closed by a pallet 323 disposed on the conveyor 301. Thus when either of the limit switches BLS1 and BLS2 is closed, the contactor B is actuated and the motor MV is energized.

The limit switch BLS1 is so disposed that it may be closed when the rack 305 is interlaced with the conveyor 301 and a loaded pallet on a level of the rack drops on the conveyor chains 321. The other limit switch BLS2 is so disposed that when the loaded pallets 323 reach an advanced position, such that they are about to disengage the arm 327 of limit switch BLS1, they engage the arm 329 of limit switch BLS2.

A plate 335 (FIG. 3) extends on each side of the loaded-pallet conveyor array. The plates 335 serve to support a block stop plate 337. This block stop plate 337 is of L section and extends between the end plates 335 on each side of the conveyor array with its lower edge 338 above the conveyor chains 321 by a distance sufficient to permit unloaded pallets 324 to pass through (FIG. 4). The plate serves to stop the leading blocks 341 of loaded pallets 323 advanced by the conveyors 301 and 303 to permit the empty pallets 324 to pass through to the empty-pallet conveyor array. The L-shaped plate is so disposed along the conveyors 301 and 303 with reference to the switch BLS2 that the last pallet 343 of a row of loaded pallets 323 has disengaged the limit switch BLS2 when the leading blocks 341 have come into engagement with the stop 337 and the following blocks 345 have come into engagement with the leading blocks. When the limit switch BLS2 is disengaged, the motor MV is deenergized, but the motor has sufficient inertia to move the loaded pallets 323 so that the blocks 341 on the leading pallets 323 are in firm engagement with the plate 337 and the blocks 345 on the following pallets are urged into firm engagement with the blocks on the leading pallet.

The empty-pallet conveyor array is similar to the pallet conveyor disclosed in Patent 2,990,069. For the purpose of helping in the understanding of this invention and its relationship to Patent 2,990,069, the parts of the empty-pallet conveyor array shown in FIGS. 1 and 2 of this application, are labeled identically to the corresponding parts of the patent. From this labelling the operation of the empty-pallet conveyor array will be understood. The plates 335 may serve as a support for the pallet unloader 69—71 portions of the empty-pallet conveyor array and for the motor 93 which drives the unloaders. The empty-pallet conveyor shown in Patent 2,990,069 is typical of conveyors which could be used cooperatively with the loaded-pallet conveyor array. Other empty-pallet conveyors could be used in accordance with the broader aspects of this invention and this invention is not limited as to empty-pallet transfer to the patent.

The buncher includes a pusher plate 349 (FIG. 3) on one side of the array which is adapted to engage the blocks 341—345 (FIG. 2) and move them generally transversely to the L section stop plate 337. The pusher plate 349 is mounted on a frame 351 which is suspended from a rod 353 extending from a fluid cylinder 355 and reciprocable by the pressure in this cylinder. The rod 353 is engaged centrally with the pusher plate 349 and when it moves, under the fluid pressure in the cylinder, carries the plate and the frame 351 from which it extends, with it. The cylinder is mounted on the plate 335 on one side of the array. The position of the cylinder 355 is adjustable in the direction of travel of the rod 353 so that the extent of transverse movement of the plate 349 may be set.

The supply of air (or other fluid) to the cylinder 355 is controlled by a double acting valve VB (FIG. 11) which may be positively set in one position or in the opposite position by energization of one or the other of a pair of solenoids SB1 or SB2. The solenoids SB1 or SB2 are adapted to be connected between conductors AL1 and AL2 by the closing of limit switches BLS3 or BLS4, respectively. When SB1 is actuated, the valve VB is set so that the fluid pressure in the cylinder advances the pusher plate 349 inwardly. When solenoid SB2 is energized, the pressure in the cylinder is such that the pusher plate 349 is retracted.

Limit switches BLS3 and BLS4 are normally open. BLS3 is mounted on stop 337 so that it is actuated (closed) by leading blocks 341 just as their forward movement is stopped. This sets VB to move the pusher 349 inwardly. Switch BLS4 is mounted on the frame 360 in which the frame 351 slides and is actuable by a lip 362 (FIG. 2) on the frame 351 when the frame 351 reaches the extreme inward position. Actuation of switch BLS4 sets VB to cause the pusher 349 to return to its initial retracted position.

The clamper unit includes a clamper 361 suspended from a boom 363. The clamper 361 (FIGS. 7, 9, 10) includes a frame-like supporting structure comprising a pair of channels 365 and 367 on which are supported a pair of rectangular tubes 369 and 370 into each of which a rod 373 and 375 telescopes. A fixed clamping jaw 377 having an engaging area sufficient to engage one side 378 of a block assembly 380 is suspended from the face of one of the channels 365. Movable clamping jaws 379 and 381 are suspended from telescoping rods 373 and 375, respectively. A plate 383 is secured to the channels 365 and 366 below the tubes 369 and 371 defining a space between the tubes and the plate. In this space adjacent the ends of the tubes 369 and 371 into which the telescoping rods 373 and 375 pass, a pair of cylinders 385 and 387 are suspended from an angle bracket 389 secured to the tubes 369 and 371. Each of the cylinders 385 and 387 carries a rod 391 and 393 reciprocable by change of fluid pressure in the cylinders. Each of the rods 391 and 393 is secured above the center of a corresponding movable jaw 379 and 381, respectively, and depending on the direction in which pressure is applied in the corresponding cylinders 385 and 387 is capable of moving the jaw guided by the corresponding telescoping unit 369—373 and 371—375 inwardly and outwardly. The fluid supply is common to the cylinders 385 and 387 and is controlled by a valve VC (FIG. 11) which permits the pressure in either of the two opposite directions to be applied positively. The valve VC may be mounted on the I-beam 426 and may be connected by flexible tubes and tubes extending along the boom 363 to the clamper cylinders 385 and 387. The valve is controlled by solenoids SC1 and SC2; SC1 being adapted to be connected between conductors AL1 and AL2 through a clamp pushbutton PC and a stop pushbutton ST and SC2 being similarly adapted to be connected through release pushbutton PO. The instantaneous actuation of button PC causes the jaws 379 and 381 to move inwardly and the instantaneous actuation of button PO causes the jaws to move outwardly. The plate 383 below the cylinders 385 and 387 provides a surface for engagement with the tops of the blocks 380.

The position of the cylinders 385 and 387 in the direction of the travel of the rods 391 and 393 may be adjustable so that the span of the jaws 377 and 379 and 381 may be set within limits to correspond to different dimensions of block assemblies in the direction between the jaws. In addition there may be more than two cylinder-jaw units where the dimension of the block assembly in the direction parallel to the jaw surfaces is long. Where the span between the jaws 377 and 379—381 is adequately long the buncher may be dispensed with.

The boom 363 consists of a pair of channels 395 and 397 braced by one or more cross strips 399 or by an elongated cross strip. The channels 395 and 397 are secured to a strip 401 which is in turn secured centrally across the tubes 369 and 371 of the clamper 361. The clamper unit is thus a rigid structure. An I-bolt 403 is mounted centrally between the ends of the strip 401; the bolt 403 serves as an anchor for a cable 405 for raising or lowering the clamping unit.

The carriage (FIG. 5) includes a plurality of shafts 411 and 413 from the ends of which wheels 415 and 417 extend rotatable with the shafts. A plate 419 is suspended from the shafts 411 and 413 by bearings 421 and 423 secured along opposite sides of the plate 419 in which the shafts 411 and 413 are rotatable. The wheels 415 and 417 engage a track 425 extending from a position over the buncher where the block assembly is formed to a position where the blocks are stacked. The track 425 is mounted on I-beams 426 supported on the flanges on I-beam columns 428. Cross plates 430 extend between the channels 426.

The carriage also includes a drive motor MC which is connected through gearing 427 to one of the shafts 411. This shaft 411 is in turn connected through sprocket wheels 429 and 431 and chains 433 and 435 to the other shaft 413. When the motor MC is energized, the shafts 411 and 413 and the wheels 415 and 417 are rotated moving the carriage in one direction or the other. For the purpose of retarding the motion of the carriage, a brake 437 is mounted on the plate 419 which engages the directly driven shaft 411. The brake 437 may be electromagnetically releasable when power is applied to the motor MC.

The carriage also includes a winch comprising the cable 405 and a drum 439 on which the cable 405 may be wound or from which it may be payed out. The drum 439 is rotatable by a hoisting motor MU through reduction gearing 443. The motor MU, gearing 443 and drum 439 are mounted on a raised platform 447 on the plate 419.

The plate 419 of the carriage has a central rectangular opening from which a vertical housing 447 extends. This housing 447 is made up of channel shaped sections 449 and 451 with flanges 453 and 455 extending from both the long and the short edges of each of the channels. The channel sections are supported from the plate by the flanges 455 (FIG. 7) extending from the short sides of the ends. The flanges 453 extending from the long sides of the ends are placed vertically face to face and serve as bearings for rollers 457 and 459 (FIG. 7) rotatable about axes near the upper and lower ends of the flanges. In addition, the sides of the channel sections 449 and 451 serve as bearings for upper and lower rollers 461 and 463 extending from each of the sides. The latter rollers 461 and 463 are rotatable about axes at right angles to the rollers 457 and 459 between the flanges. There are in all twelve rollers 457—459—461—463. The channels 395 and 397 which form the boom 363 engage these twelve rollers and are guided by them. The rollers 457 and 459 between the flanges 453 engage the faces of the channels 395 and 397 and the rollers 461 and 463 extending from the sides of the channel sections 449 and 451 engage the ends of the channels 395 and 397 of the boom 363. The channel section 449 facing the winch drum 439 is slotted and the sides of the section serve as a bearing for a sheave 465 which is rotatable in the slot 467. The cable 405 of the winch is in engagement with the sheave 465 and extends downward through the slot 467 and the plate 419 engaging the I-bolt 403 on the cross plate 401 of the clamper 361.

To the top of the channel section 449 in which the sheave 465 is rotatable, an angle bracket 471 is secured. A limit switch DLS is supported on the horizontal surface of this bracket 471. Below the horizontal surface of this bracket, a pair of arms 473 (FIGS. 7 and 8) are pivotally supported and these arms carry a roller 475 between their free ends. The roller is centrally connected to the actuating arm 477 of the limit switch DLS through a spring 479. The roller 475 engages the cable 405 which passes over the sheave 465 and by the force of gravity is capable of changing its position in accordance with the tension in the cable. When the cable is taut the roller 475 is urged upwardly. When the cable is relaxed, the roller 475 drops downwardly under gravity. When the roller 475 is urged upwardly, the switch DLS is in the closed position; when the roller drops downwardly, the switch DLS is opened. A limit switch ULS is mounted on the angle bracket 471. This switch ULS has an actuating arm 407 which may be engaged by a block 472 on the boom 363 when the boom reaches the uppermost position.

The electrical circuit for controlling the winch is shown in FIG. 11. This circuit includes contactors U and D which are connected to energize the winch motor MU so that it rotates in a direction such as to move the boom upwardly or downwardly. The contactor U has normally open main contacts 481, a normally open auxiliary contact 483 and a normally closed auxiliary contact 485. The contactor D includes main contacts 487, a normally open auxiliary contact 489 and a normally closed auxiliary contact 491. The motor MU is adapted to be connected to conductors L1, L2, L3 through contacts 481 so as to be rotated to move the clamper unit upwardly and through contacts 487 so as to be rotated to move the unit downwardly. The coil of contactor U is adapted to be connected between conductors AL1 and AL2 through stop pushbutton ST1, up pushbutton PU, contact 491, up limit switch ULS and overload contacts 493 and 495. Once U is actuated it is locked in through contact 483 and contact 485 prevents energization of the coil of D. The coil of D is similarly adapted to be connected between conductors AL1 and AL2 through down pushbutton PD, DLS and 493 and 495 and to be locked in through 489.

The switch ULS is adapted to be opened when the clamper 361 reaches the uppermost position and the arm 407 is engaged by the block 472. The switch DLS is adapted to be opened when the clamper 361 is over the blocks 380 and the cable 405 is relaxed. With ULS, DLS and PU closed, the clamper unit moves upwardly; with ULS, DLS and PD closed, the unit moves downwardly.

A plurality of limit switches LS1, LS2, LS3 and LS4 are mounted along the track 425. The switches LS1 through LS4 are mounted along one side of the track, LS1 and LS2 from the I-beam 426 on the one side, and LS3 and LS4 from the end cross plates 430. The actuating arms 501, 503, 505 and 507 (FIG. 6) of the switches LS1, LS2, LS3 and LS4 extend above the track 425 so that they are actuable by the edges of the plate 419, LS1, LS2, LS3 being actuable by the forward edge of the plate and LS4 by the reverse edge of the plate 419. The arms 501, 503, 505 and 507 are provided with rollers so that the plate 419 may roll over the arms without damaging them. Since switches LS1 through LS4 are on one side of track 425 they are not interfered with by the clamping unit as it is carried by the carriage.

Switch LS1 has a normally open contact 509 (FIG. 11), LS2 a normally closed contact 511 and a normally open contact 513, and LS3 and LS4 each has normally closed contacts 515 and 517. Switches LS3 and LS4 are so disposed that contacts 515 and 517 are opened when the carriage reaches the extreme forward position beyond the stacking position and the extreme reverse position over the buncher. Switches LS1 and LS2 are disposed along the track 425 with LS2 spaced from LS1 so that the carriage moves forward a distance equal to half (or a similar fraction) of the dimension of the blocks in the direction along the track between the point where LS1 is actuated and the point where LS2 is actuated. Actuation of LS1 closes contact 509, of LS2 opens contact 511 and closes contact 513.

The control apparatus for motor MC includes a pair of contactors F and R (FIG. 11). These contactors F and R each has a plurality of main contacts 519 and 521 and an auxiliary contact 523 and 525. These contactors may be interlocked mechanically or through additional auxiliary contacts. The control circuit for the motor MC also includes relays R1 and R2. Relay R1 has a pair of normally open contacts 527 and 529 and a normally closed contact 531. Relay R2 has a normally open contact 533 and a pair of normally closed contacts 535 and 537.

The coil of contactor R is adapted to be connected between conductors AL1 and AL2 through a stop pushbutton ST2, reverse pushbutton PR, contact 517 of LS4 and contacts 539 and 541 of overload relays. The coil of R is adapted to be locked in by the normally open lock-in contact 525 of the contactor R. The coil of contactor F is adapted to be connected between conductors AL1 and AL2 through the stop pushbutton ST2, the forward pushbutton PF, normally closed contacts 531 and 535 of relays R1 and R2, the contact 515 of limit switch LS3 and contacts 539 and 541. The pushbutton PF is adapted to be shunted by the lock-in contact 523 of the contactor F. Relay R1 is adapted to be connected between conductors AL1 and AL2 through the contact 509 of the limit switch LS1, normally closed contact 537 of relay R2 and the normally closed contact 511 of the limit switch LS2. The contact 509 is adapted to be shunted by a lock-in contact 529 of relay R1. The coil of relay R2 is adapted to be connected between conductors AL1 and AL2 through the contact 509 of limit switch LS1 or contact 529 of relay R1 and the normally open contact 513 of limit switch LS2. This latter contact 513 is adapted to be shunted by a normally open lock-in contact 533 of relay R2. The motor MC is energized to rotate in a direction such as to move the carriage forward towards the stacking position when the contactor F is energized and to move the carriage reversely towards the bunching position when the contactor R is energized.

*Standby*

In the standby condition of the apparatus, the conductors L1, L2 and L3, and conductors AL1 and AL2 are energized and are ready to energize the various components of the control system. In addition switch SW is closed so that contactor K which controls the empty pallet conveyor motor MP (161 FIG. 8, Serial No. 619,247) may be energized by empty pallets in magazines 201 and is capable of operating. In the standby condition of the apparatus, the limit switch PLS for the empty pallet conveyor control is open so that the contactor K which drives the motor MP is deenergized and the motor is deenergized. In addition, limit switches BLS1 and BLS2, are open so that contactor B is deenergized and the conveyor motor MV is deenergized and conveyors 301 and 303 are at rest. Limit switches BLS3 and BLS4 are open and the pusher plate 349 is retracted. Pushbuttons PC and PO are open and the jaws 379 and 381 of the clamper 361 are open as they were left at the end of the last operation.

*Operation*

In the operation of the apparatus a rack 305 having loaded pallets 323 on it is removed usually by means of a fork-lift truck from the curing furnace and moved to the receiving end of the loaded-pallet conveyor array. The fork lift is then raised usually hydraulically so that the loaded pallets 323 on its lowest level are just over the conveyors 301 and 303 of the array. The truck is then backed over the array so that the loaded pallets 323 on the lowest level are just over the conveyors 301 and 303 with the leading pallet 323 over 301 extending well over limit switch BLS1. The fork lift is then lowered so that the loaded pallets 323 engage the conveyors 301 and 303, one of the loaded pallets engaging the limit switch BLS1, actuating contactor B and energizing the motor MV. Instead of lowering with the fork lift the loaded racks may be mounted on an elevator and lowered automatically. This would release the fork lift truck for another operation.

The conveyors 301 and 303 once loaded are advanced, advancing the pallets 323. Before limit switch BLS1 is disengaged, BLS2 is engaged and contactor B is maintained actuated. The advance of the pallets 323 on the conveyors 301 and 303 now continues until the leading blocks 341 engage the stop plate 337. This stops the blocks. The limit switches BLS1 and BLS2 are so disposed that when the leading blocks 341 engage the stop plate, the limit switch BLS2 remains closed until the leading and following blocks 341 and 345 are moved together. The inertia of the motor MV is such that after BLS2 opens it continues to rotate so that the blocks are firmly moved into engagement with the stop plate and the blocks 345 on the rear pallets 323 are bunched tightly with the blocks 341 on the front pallets.

As the leading blocks 341 move into engagement with the stop plate 337, they also actuate limit switch BLS3, closing this switch and energizing solenoid SB1. Fluid is then admitted into the bunching cylinder 355 causing the pusher plate 349 to move inwardly bunching the blocks. The movement of the blocks by the pusher plate 349 causes the switch BLS3 to be opened. But the opening of the switch and the consequent deenergization of the solenoid SB1 does not affect the valve VB which remains open and permits the pressure to continue to be applied to move the pusher plate. The movement continues until the limit switch BLS4 is actuated, energizing solenoid SB2 and reverting the pusher plate 349 to the initial position. The leading empty pallets 324 are capable of moving through the slot 324 in the stop plate 337 but are not moved because the limit switches BLS1 and BLS2 are open.

After the blocks are bunched, the reverse pushbutton PR is closed, energizing contactor R and causing the carriage motor MC to move the carriage towards the bunching position. When the carriage reaches the bunching position, limit switch LS4 is opened, stopping the carriage. The application of the brake 437 assures that the carriage is stopped instantaneously. The pushbutton PD is now actuated to close the circuit through the contactor D energizing the winch motor MU to lower the clamper unit. The winch cable 405 is now payed out lowering the clamper unit until it reaches a position so that the jaws 378, 379, 381 of the clamper extends on both sides of the rectangular array of bunched blocks. At this point the winch cable 405 is relaxed and the limit switch DLS is opened stopping the winch motor MU. Fluid pressure is now applied in the cylinder of the clamper by actuating button PC so that the rectangular block assembly is engaged by the jaws 378 and 379 and 381 of the clamper. The clamper jaws move the blocks together into a firm assembly.

The pushbutton PU is now closed energizing the contactor U which in turn energizes the winch motor MU to raise the clamper unit. When the clamper reaches the uppermost position, limit switch ULS is opened stopping the winch motor MU. The winch motor is stopped with the clamper under the plate 419 of the carriage and the clamper and the blocks are able to be moved under the tracks 425.

With the loaded clamper 361 raised to a position just under the carriage plate 419, the forward pushbutton PF is closed and the contactor F is energized, energizing the motor MC to move towards the stacking position. When the motor reaches limit switch LS1 this limit switch is closed, energizing relay R1 and locking the relay in the energized position. The circuit through the forward contactor F is then opened by the now open contact 531 of relay R1 and the motor MC is stopped. The pushbutton PD is now closed so that the down contactor D is energized, energizing motor MU to drop the boom 361 and the blocks in the clamper are now deposited on the stack Z.

The clamper unit may now be raised and the carriage returned to the buncher position by closing the pushbutton PR. While the carriage is being returned to the buncher position, the rack 305 may be dropped so that the loaded pallets on the level just above the lowest are slid onto the conveyors 301 and 303 and are advanced towards the stop plate 337. As the latter loaded pallets 323 advance, the empty pallets 324 from which the blocks have been bunched and removed are also advanced. These pallets 324 are then advanced through the slot below stop plate 337 onto the empty-pallet conveyor array and when they move into the magazines 73 and 75 and engage the limit switch PLS they energize the empty-pallet conveyor 77 to advance these empty pallets toward the molding machines.

In the meantime the newly removed loaded pallets 323 are advanced to the stop plate 337 and then bunched as described above. After being bunched, the blocks are lifted as described above and moved by the carriage to the stacking position. For this purpose the button PF is closed. Contactor F is at this time energized through contact 527 of relay R1 which was actuated and locked in during the last stacking operation by the closing of switch LS1. The carriage is now advanced forward and as it advances over limit switch LS1 closing this limit switch, the motor MC is unaffected and continues to rotate because the relay R1 remains actuated and its now closed contact 527 remains closed. The movement of the carriage now continues until the limit switch LS2 is actuated closing the normally open contact 513 and opening the normally closed contact 511. The opening of the normally closed contact 511 deenergizes relay R1 opening the circuit for contactor F, and stopping the motor MC. The closing of the normally open contact 513 closes a circuit through relay R2, energizing this relay and opening a normally closed contact 535 in series with the contactor F so that the contactor F is maintained deenergized in spite of the energization of relay R1. When contactor F is deenergized, motor MC is stopped. The limit switch LS2 is in an advanced position along the track 425 with reference to the limit switch LS1 such that the blocks in the clamper are advanced by approximately the distance of a half block along the track with reference to the blocks in the clamper during the first operation. The distance between the limited switches can be adjusted to set any spacing desired. The clamper is now dropped and the blocks deposited. These blocks are staggered with reference to the blocks deposited during the first operation and thus a firm stack of blocks is laid down.

After the latter blocks are deposited, the clamper may be raised and the carriage returned to the buncher position for another operation. As the carriage returns the contact 513 of limit switch LS1 opens, resetting relay R2. The apparatus is now reset to the original condition and during a further stacking operation, the clamper will be stopped over the same position as it was stopped during the first operation. The stack is thus staggered as described.

*Conclusion*

While a preferred embodiment has been disclosed herein, it is realized that many modifications thereof are feasible. This invention then is not to be restricted except insofar as is necessitated by the spirit of the prior art.

We claim as our invention:

1. Block handling apparatus for transferring blocks on pallets on a rack to a stack, there being a plurality of block-loaded pallets substantially on each level of said rack, the said apparatus comprising in combination an array of conveyors corresponding in number to said plurality, said conveyors being adapted to engage said rack in pallet unloading relationship, motor means connected to said conveyors when energized for advancing said conveyors, normally open first circuit means connected to said motor means when closed for energizing said motor means, first switch means connected to said circuit means and actuable by engagement with a loaded pallet on a rack engaged with said conveyors in pallet unloading relationship for closing said circuit means to energize said motor means, said switch means being actuable only so long as said loaded pallet is in engagement therewith, stop means disposed with its stopping surface along a predetermined line in the path of said conveyors adapted to engage the blocks on loaded pallets for stopping the advance of said blocks, bunching means including means disposed adjacent said first stop means when energized movable transversely to said first stop means from a position adjacent the conveyor on one side of said array inwardly for moving the blocks inwardly thereby bunching said blocks on said conveyor, normally open second circuit means for energizing said transversely movable means, second switch means actuable by engagement with said loaded pallet to close said second circuit means, and means to be engaged with the blocks bunched by said bunching means for removing said blocks from said conveyors.

2. Block handling apparatus for transferring blocks on pallets on a rack to a stack, there being a plurality of rows of block-loaded pallets on each level of said rack, the said apparatus comprising in combination an array of conveyors corresponding in number to said plurality, said conveyors being adapted to engage said racks in pallet unloading relationship, motor means connected to said conveyors when energized for advancing said conveyors, normally open first circuit means connected to said motor means when closed for energizing said motor means, first switch means connected to said circuit means and actuable by engagement with a loaded pallet on a rack engaged with at least one of said conveyors in pallet unloading relationship for closing said circuit means to energize said motor means, said circuit remaining closed only so long as said switch means remains engaged with said last-named loaded pallet, stop means disposed to engage and stop blocks on said conveyor when said last-named blocks have been moved to a predetermined position along said conveyor, said stop means being so disposed that said first switch means is permitted to open when the blocks of a row of pallets on said one conveyor engages said stop means, bunching means including means disposed adjacent said stop means when actuated movable transversely to said stop means from a first position adjacent said stop means inwardly to a second position and from said second position to said first position, and when moved to said first position adapted to engage and move blocks on said conveyor engaging said stop means inwardly, normally open second circuit means when closed actuating said transversely movable means to move from said first position to said second position, switch means actuable by engagement with said loaded pallets when the blocks on said pallets are near said first stop means to close said second circuit means, normally open third circuit means when closed for actuating said transversely movable means to move from said second position to said first position, third switch means connected to said third circuit means and actuable by said transversely movable means when it reaches said second position under actuation of said second circuit means to close said circuit means, and means for engaging the blocks bunched by said bunching means for removing said blocks from said conveyors.

3. Block handling apparatus for transferring blocks on pallets on a rack to a stack, there being a plurality of rows of block-loaded pallets on each level of said rack, the said apparatus comprising in combination an array of conveyors corresponding in number to said plurality, said conveyor being adapted to engage said racks in pallet unloading relationship, motor means connected to said conveyors when energized for advancing said conveyors, normally open first circuit means connected to said motor means when closed for energizing said motor means, first switch means connected to said circuit means and actuable by engagement with a loaded pallet on a rack engaged with at least one of said conveyors in pallet unloading relationship for closing said circuit means to energize said motor means, stop means disposed to engage and stop blocks on said conveyors when said last-named blocks have been moved to a predetermined position along said conveyors, bunching means including means disposed adjacent said first stop means when actuated movable transversely to said first stop means from a first position adjacent said stop means inwardly to a second position, and when moved to said second position adapted to engage and move blocks on said conveyor engaged with said first stop means inwardly, normally open second circuit means when closed for actuating said transversely movable means to move from said first position to said second position, second switch means actuable by engagement with said loaded pallets when the blocks on said pallets are near said stop means to close said second circuit means, and means for engaging the blocks bunched by said bunching means for removing said blocks from said conveyors.

4. Block handling apparatus for transferring blocks on pallets on a rack to a stack, there being a plurality of rows of block-loaded pallets on each level of said rack, the said apparatus comprising in combination an array of coveyors corresponding in number to said plurality, said conveyors being adapted to engage said rack in pallet unloading relationship, motor means connected to said conveyors when energized for advancing said conveyors, normally open first circuit means connected to said motor means when closed for energizing said motor means, first switch means connected to said circuit means and actuable by engagement with a load pallet on a rack engaged with at least one of said conveyors in pallet unloading relationship for closing said circuit means to energize said motor means, said circuit means remaining closed only so long as said switch means remains engaged with said last-named loaded pallet, said first switch means including a plurality of switches connected in parallel in said first circuit means and so spaced along at least said one conveyor that at least one of said switches is actuated by a loaded pallet to maintain said first circuit means closed until said loaded pallet reaches a predetermined position, stop means disposed to engage and stop blocks on said conveyors when said last-named blocks have been moved to a predetermined position along said conveyors, said stop means being so disposed that said first switch means is permitted to open when the blocks of a row of pallets on said one conveyor engages said stop means, bounching means including means disposed adjacent said stop means when actuated movable transversely to said stop means from a first position adjacent said first stop means inwardly a second position nearer said second stop means and from said second position to said first position, and when moved to said second position adapted to engage and move blocks on said conveyor engaged wtih said first stop means inwardly, normally open second circuit means when closed for actuating said transversely movable means to move from said first position to said second position, switch means actuable by engagement with said loaded pallets when the blocks on said pallets are near said stop means to close said second circuit means, normally open third circuit means when closed for actuating said transversely movable means to move from said second position to said first position, third switch means connected to said third circuit means and actuable by said transversely movable means when it reaches said second position under actuation of said second circuit means to close said third circuit means, and means for engaging the blocks bunched by said bunching means for removing said blocks from said conveyors.

5. Block handling apparatus for transferring blocks on pallets on a rack to a stack, there being a plurality of rows of block-loaded pallets on each level of said rack, the said apparatus comprising in combination an array of conveyors corresponding in number to said plurality, said conveyors being adapted to engage said rack in pallet unloading relationship, motor means connected to said conveyors when energized for advancing said conveyors, normally open first circuit means connected to said motor means when closed for energizing said motor means, first switch means connected to said circuit means and actuable by engagement with a loaded pallel on a rack in engagement with at least one of said conveyors in pallet unloading relationship for closing said circuit means to energize said motor means, said circuit remaining closed only so long as said switch means remains engaged with said last-named loaded pallet, said first switch means including a plurality of switches connected in parallel in said first circuit means and so spaced along at least said one conveyor that at least one of said switches is actuated by a loaded pallel to maintain said first circuit means closed until said loaded pallet reaches a predetermined position, stop means disposed to engage and stop blocks on said conveyors when said last-named blocks have been moved to a predetermined position along said conveyors, said stop means being so disposed that said first switch means is permitted to open when the blocks of a row of pallets on said one conveyor engages said stop means, bunching means including means disposed adjacent said stop means when actuated movable transversely to said stop means from a first position adjacent said first stop means inwardly to a second position, and when moved to said second position adapted to engage and move blocks on said conveyor engaged with said stop means inwardly, normally open second circuit means when closed for actuating said transversely movable means to move from said first position to said second position, second switch means actuable by engagement with said loaded pallets when the blocks on said pallets are near said stop means to close said second circuit means, and means for engaging the blocks bunched by said bunching means for removing said blocks from said conveyors.

6. Block handling apparatus for transferring blocks on pallets on a rack to a stack, there being a plurality of rows of block-loaded pallets on each level of said rack, the said apparatus comprising in combination an array of conveyors corresponding in number to said plurality, said conveyor being adapted to engage said rack in pallet unloading relationship, motor means connected to said conveyors actuable to advance said conveyors, means connected to said motor means and responsive to a loaded pallet on a rack in pallet unloading engagement with at least one of said conveyors for actuating said motor means to advance said conveyors, stop means disposed to engage and stop blocks on said conveyors when said last-named blocks have been moved to a predetermnied position along said conveyors, bunching means including means disposed adjacent said stop means when actuated movable transversely to said stop means from a first position inwardly to a second position nearer said second stop means, and when moved to said second position adapted to engage and move blocks on said conveyor engaged with said stop means inwardly, means responsive to said loaded pallets when said loaded pallets are near said stop means for actuating said transversely movable means to move from said first position to said second position to move said blocks inwardly, and means for engaging the blocks bunched by said bunching means for removing said blocks from said conveyors.

7. Block handling apparatus for transferring blocks on pallets on a rack to a stack, there being a plurality of rows of block-loaded pallets on each level of said rack, the said apparatus comprising in combination an array of conveyors corresponding in number to said plurality, said conveyors being adapted to engage said rack in pallet unloading relationship in one region of said conveyors, means connected to said conveyors and responsive to a pallet in a predetermined region on at least one of said conveyors for advancing said conveyors, said last-named region including said one region of said conveyors, and said last-named pallet being on a rack in pallet unloading engagement with said one region, stop means disposed to engage and stock blocks on said conveyors when the pallets of said last named blocks have been moved beyond said predetermined region, bunching means including means disposed adjacent said stop means when actuated movable transversely to said stop means from a first position adjacent said first stop means inwardly to a second position adjacent said stop means and from said second position to said first position, said transversely movable means when moved from said first position to said second position moving blocks inwardly, means responsive to block loaded pallets on said conveyor when they reach a position adjacent said stop means for actuating said transversely movable means to move from said first position to said second position to move blocks engaged by said first stop means inwardly, and means responsive to said transversely movable means when said movable means reaches said second position for returning said movable means to said first position.

8. Block handling apparatus for transferring blocks on pallets on a rack to a stack, there being a plurality of rows of block-loaded pallets on each level of said rack, the said apparatus comprising in combination an array of conveyors corresponding in number to said plurality, said conveyors being adapted to engage said rack in pallet unloading relationship in one region of said conveyors, means connected to said conveyors and responsive to a pallet in a predetermined region on at least one of said conveyors for advancing said conveyors, said last-named region including said one region of said conveyors, and said last-named pallet being on a rack in pallet unloading engagement with said one region, stop means disposed to engage and stop blocks on said conveyors when the pallets of said last named blocks have been moved to a predetermined position, bunching means including means disposed adjacent said stop means when actuated movable transversely to said stop means from a first position adjacent said stop means to a second position adjacent said stop means and said transversely movable means when moved from said first position to said second position moving blocks inwardly, means responsive to block loaded pallets on said conveyor when they reach a position adjacent said stop means for actuating said transversely movable means to move from said first position to said second position to move blocks engaged by said stop means inwardly.

9. Block handling apparatus for transferring blocks on pallets on a rack to a stack, there being a plurality of rows of block-loaded pallets on each level of said rack, the said apparatus comprising in combination an array of conveyors corresponding in number to said plurality, said conveyors being adapted to engage said racks in pallet unloading relationship in one region of said conveyors, means connected to said conveyors and responsive to a pallet in a predetermined region on at least one of said conveyors for advancing said conveyors, said last-named region including said one region of said conveyors, and said last-named pallet being on a rack in pallet unloading engagement with said one region, stop means disposed to engage and stop blocks on said conveyors when the pallets of said last named blocks have been moved beyond said predetermined region, said stop means permitting the pallets on which the blocks are advanced to said stop means to pass therethrough unloaded, bunching means including means disposed adjacent said stop means when actuated movable transversely to said stop means from a first position adjacent said first stop means inwardly to a second position adjacent said first stop means and from said second position to said first position, said transversely movable means when moved from said first position to said second position moving blocks inwardly, means responsive to block loaded pallets on said conveyor when they reach a position adjacent said stop means for actuating said transversely movable means to move from said first position to said second position to move blocks engaged by said stop means inwardly, means responsive to said transversely movable means when it reaches said second position for returning said movable means to said first position, and pallet conveyor means disposed to receive the unloaded pallets passed through said stop means and transfer said last-named pallets to a point of utilization.

10. Block handling apparatus comprising means for assembling pluralities of blocks successively into substantially horizontal rectangular assemblies, and means to be connected to each said assembly for moving said assemblies successively from the position where said blocks are successively assembled to a stacking position and for stacking said assembly as a substantially rectangular assembly at said stacking position, said assembly being movable at said stacking position by said moving means in a direction generally parallel to two of the parallel sides of said assembly, said moving means including first means for interrupting the movement in said direction in a first position, second means for interrupting the movement in said direction in a second position displaced from said first position along said direction by a distance equal approximately to a small portion of the dimension of a block in said direction, and means interconnecting said first and second means permitting only alternate interruption of said moving means in said first and second positions respectively during alternate stacking operations thereof.

11. In combination a track, a carriage movable on said track, motor means connected to said carriage when energized for moving said carriage along said track, circuit means connected to said motor means when closed for energizing said motor means, normally closed first switch means connected to said circuit means when open opening said circuit means, normally closed second switch means connected to said circuit means when open opening said circuit means, first means connected to said first switch means and responsive to said carriage when said carriage is in a first position along said track for opening said first switch means, second means connected to said second switch means and responsive to said carriage when said carriage is in a second position along said track for opening said second switch means, and interlock means between said first and second responsive means permitting said first switch means and said second switch means to be opened only alternately.

12. Apparatus for stacking at a stacking position, blocks bunched into a rectangular assembly in a bunching position comprising in combination a track extending between said bunching position and said stacking position, a carriage movable on said track between said bunching position and said stacking position, clamping means on said carriage movable with said carriage adapted to engage each assembly at said bunching position, to hold said engaged assembly while said carriage is being moved to said stacking position and to release said engaged assembly at said stacking position, said blocks being moved in a direction generally parallel to two parallel sides of said assembly at said stacking position, first means responsive to said carriage while moved as aforesaid and when it arrives at a first region of said stacking position for stopping said carriage, second means responsive to said carriage while moved as aforesaid and when it arrives at a second region of said stacking position for stopping said carriage, said second region being displaced from said first region by a distance of the order of a small fraction of the dimension of a block along said direction, and interlocking means between said first and second responsive means permitting said first responsive means to stop said carriage only on alternate actuation of said first means by said carriage.

13. Block handling apparatus comprising means for assembling pluralities of blocks successively into substantially horizontal rectangular assemblies, and means to be connected to each said assembly for moving said assemblies, each assembly as a unit, successively from the position where said blocks are successively assembled to a stacking position and for stacking said assembly, each assembly as a unit, at said stacking position, said assembly being movable generally linearly at said stacking position by said moving means, said moving means including first means for interrupting the movement in said direction in a first position, second means for interrupting the movement in said direction in a second position displaced from said first position along said direction by a distance equal approximately to a small portion of the dimension of a block in said direction, and means interconnecting said first and second means permitting only alternate interruption of said moving means in said first and second positions respectively during alternate stacking operations thereof.

14. Block handling apparatus for handling blocks disposed on pallets on a rack, said rack being delivered to said apparatus in an elevated position, said pallets in effect constituting vertically spaced block-loaded shelves on said rack, there being at least two rows of said vertically spaced shelves on each rack, the said apparatus comprising at least two generally parallel loaded-pallet conveyors at a lower level than said rack, each conveyor including a fixed frame over which a conveyor web passes and each conveyor having a receiving terminal projecting outwardly, said webs passing over said terminals and said terminals being so spaced as to be capable of interlinking with said rack and engaging simultaneously in pallet unloading relationship the pallets in both said rows of shelves at any vertical shelf position of said rack when said last-named pallets settle on said terminals by the lowering of said rack, motor means connected to the webs of both said conveyors, when energized advancing the webs of both said conveyors, circuit means connected to said motor means when closed for energizing said motor means, said circuit means including switch means open in the standby condition of said apparatus to maintain said circuit means open in said standby condition, and means mounting said switch means on at least one of said terminals so as to be closed by at least one of said pallets when said pallets settle on said terminal to close said circuit means.

15. Block handling apparatus for handling blocks disposed on pallets on a rack, said rack being delivered to said apparatus in an elevated position, said pallets in effect constituting vertically spaced block-loaded shelves on said rack, there being at least two rows of said vertically spaced shelves on each rack, the said apparatus comprising at least two generally parallel loaded-pallet conveyors, at a lower level than said rack, each conveyor having a fixed frame over which a conveyor web passes and each conveyor including a receiving terminal projecting outwardly, said web passing over said terminals and said terminals being so spaced as to be capable of interlinking with said rack and engaging simultaneously in pallet unloading relationship the pallets in both said rows of shelves at any vertical shelf position of said rack when said last-named pallets settle on said terminal by the lowering of said rack, motor means connected to the webs of both said conveyors, when energized advancing said webs of both said conveyors, circuit means connected to said motor means when closed for energizing said motor means, said circuit means including switch means open in the standby conditon of said apparatus to maintain said circuit means open in said standby condition, means mounting said switch means on at least one of said terminals so as to be closed by at least one of said pallets when said pallets settle on said terminals to close said circuit means, an empty-pallet conveyor channel connected in pallet receiving relationship to each of said loaded-pallet conveyors near the end thereof remote from said terminal, and a gate interposed between said loaded-pallet conveyors and said channels connected thereto cooperative with said loaded pallets and with said loaded pallet conveyor channels to disengage the blocks from said loaded pallets and to transmit said empty pallets along said channels.

16. Block handling apparatus for transferring blocks on pallets on a rack to a stack, said rack being delivered to said apparatus in an elevated position, the said apparatus comprising a block-loaded pallet conveyor, at a lower level than said rack, said conveyor including a fixed frame over which a conveyor web passes and also having a receiving terminal projecting outwardly so as to be capable of interlinking a rack in pallet unloading relationship when said last-named pallet settles on said terminal by the lowering of said rack, and said conveyor also having an output terminal, motor means connected to the web of said conveyor for advancing said web whereby when said receiving terminal is interlinked with a rack a block-loaded pallet on said rack which settles on said terminal is conveyed from said receiving terminal to said output terminal, empty-pallet conveyor means connected in pallet receiving relationship to said loaded-pallet conveyor at the end thereof remote from said terminal for conveying the empty pallets from which said blocks have been removed, separating gate means interposed between said block-loaded pallet conveyor and said empty-pallet conveyor means cooperative with said loaded pallets and with said loaded-pallet conveyor for separating said blocks from said pallets and setting said blocks in position to be stacked, and stacking means cooperative with said blocks separated from said pallets for stacking said blocks.

17. Block handling apparatus for transferring blocks in alignment on pallets on a rack to a stack, said rack being delivered to said apparatus in an elevated position, said apparatus comprising a block-loaded pallet conveyor at a lower level than said rack, said conveyor including a fixed frame over which a movable web passes and having a terminal over which said web passes, said terminal to be engaged in pallet unloading relationship with said rack for unloading said pallets onto said web, with said blocks remaining in alignment on said pallets, motor means connected to said web for advancing said web to advance the pallets unloaded on said conveyor, empty-pallet conveyor means in receiving relationship with said block-loaded pallet conveyor for receiving empty pallets from said last-named conveyor, separating gate means interposed between said block-loaded pallet conveyor and said empty-pallet conveyor means cooperative with said loaded pallets and with said block-loaded pallet conveyor for separating said blocks from said pallets without disturbing said alignment of said blocks, and stacking means cooperative with said aligned blocks separated from said pallets for stacking said blocks.

References Cited in the file of this patent

UNITED STATES PATENTS

| | | |
|---|---|---|
| 660,477 | Wellman et al. | Oct. 23, 1900 |
| 1,606,477 | McClelland | Nov. 9, 1926 |
| 1,850,480 | Sledge et al. | Mar. 22, 1932 |
| 2,423,557 | Gray | July 8, 1947 |
| 2,598,222 | Cahners et al. | May 27, 1952 |
| 2,619,237 | Sock | Nov. 25, 1952 |
| 2,625,284 | Atwood | Jan. 13, 1953 |
| 2,710,696 | Fontaine et al. | June 14, 1955 |
| 2,711,831 | Olson | June 28, 1955 |
| 2,732,083 | Smith | Jan. 24, 1956 |
| 2,732,084 | Chaussee et al. | Jan. 24, 1956 |
| 2,828,871 | Bardstey et al. | Apr. 1, 1958 |
| 2,869,737 | Thomas | Jan. 20, 1959 |
| 2,881,898 | Rielly | Apr. 14, 1959 |
| 2,956,696 | Drakengren | Oct. 18, 1960 |